(12) United States Patent
Madaiah

(10) Patent No.: US 10,904,715 B2
(45) Date of Patent: Jan. 26, 2021

(54) MULTIPOINT-TO-POINT (MP2P) EPS BEARER

(71) Applicant: TEJAS NETWORKS LIMITED, Bangalore (IN)

(72) Inventor: Vinod Kumar Madaiah, Bangalore (IN)

(73) Assignee: TEJAS NETWORKS LIMITED, Bangalore (IN)

(*) Notice: Subject to any disclaimer, the term of this patent is extended or adjusted under 35 U.S.C. 154(b) by 0 days.

(21) Appl. No.: 16/814,797

(22) Filed: Mar. 10, 2020

(65) Prior Publication Data

US 2020/0221264 A1 Jul. 9, 2020

Related U.S. Application Data

(63) Continuation-in-part of application No. 15/256,567, filed on Sep. 3, 2016, now abandoned.

(30) Foreign Application Priority Data

Sep. 4, 2015 (IN) .......................... 4680/CHE/2015

(51) Int. Cl.
*H04W 4/06* (2009.01)
*H04W 8/08* (2009.01)
(Continued)

(52) U.S. Cl.
CPC ............. *H04W 4/06* (2013.01); *H04W 4/029* (2018.02); *H04W 8/08* (2013.01);
(Continued)

(58) Field of Classification Search
CPC ....... H04W 4/029; H04W 8/08; H04W 88/16; H04W 28/0268; H04W 4/06; H04W 68/02; H04W 76/12; H04W 88/02; H04W 76/15
See application file for complete search history.

(56) References Cited

U.S. PATENT DOCUMENTS

2013/0301611 A1* 11/2013 Baghel ................ H04W 12/001
370/331
2013/0336305 A1* 12/2013 Yan ...................... H04B 7/0652
370/338
(Continued)

*Primary Examiner* — Oussama Roudani
(74) *Attorney, Agent, or Firm* — Barry Choobin; Patent 360 LLC

(57) ABSTRACT

A method for creating a Multipoint-to-Point EPS bearer in a packet switched transmission network is envisaged. A plurality of user equipments are installed within a tracking area assigned to a serving gateway. The user equipments are communicably coupled to an eNodeB, which is configured to receive the uplink data packets transmitted from the user Equipments. The eNodeB is communicably coupled to an S1 bearer, and with the S1 bearer designated as the destination for every uplink data packet transmitted from the eNodeB, the need for packet inspection at the eNodeB is eliminated. Likewise, since the S1 bearer is the only possible intermediate destination for the downlink data packets originating from the serving gateway, the process of packet inspection is also absolved at the serving gateway. The Multipoint-to-Point EPS bearer is communicably coupled to the user equipments for transmission of both uplink data packets and downlink data packets without packet inspection.

8 Claims, 4 Drawing Sheets

(51) Int. Cl.
*H04W 28/02* (2009.01)
*H04W 4/029* (2018.01)
*H04W 88/16* (2009.01)
*H04W 68/02* (2009.01)

(52) U.S. Cl.
CPC ....... *H04W 28/0268* (2013.01); *H04W 88/16* (2013.01); *H04W 68/02* (2013.01)

(56) References Cited

U.S. PATENT DOCUMENTS

| | | | |
|---|---|---|---|
| 2014/0105011 A1* | 4/2014 | Chandramouli | H04W 4/08 370/230 |
| 2016/0037571 A1* | 2/2016 | Hossain | H04W 76/12 370/338 |
| 2016/0353337 A1* | 12/2016 | Zhu | H04W 36/0083 |
| 2018/0139651 A1* | 5/2018 | Kim | H04L 29/12 |
| 2018/0332494 A1* | 11/2018 | Hou | H04W 72/042 |

* cited by examiner

MULTIPOINT-TO-POINT (MP2P) EPS BEARER

CROSS-REFERENCE TO RELATED APPLICATIONS

This application is a continuation-in-part of U.S. patent application Ser. No. 15/256,567 filed Sep. 3, 2016.

BACKGROUND

Technical Field

The present disclosure is related to wireless communication systems. The present disclosure is more particularly related to facilitating communication between a plurality of low power user equipments (UE) situated in a packet switched transmission network (PSTN).

Description of Related Art

Wireless communication systems are widely used to provide voice and data services across a variety of access terminals including cellular telephones, laptop computers and various User Equipment (UE) devices. Such wireless communication systems could use one or more multiple access techniques, including Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA), and the like. One of the examples of such a wireless communication system is a mobile broadband network, which, in turn, confirms to a variety of communication standards including but not restricted to $2^{nd}$ Generation (2G) technology, Global System for Mobile Communications (GSM), $3^{rd}$ Generation (3G) technology, Universal Mobile Telecommunications System (UMTS), 4th-Generation (4G) technology and Long Term Evolution (LTE).

The universal mobile telecommunication system (UMTS) defines a User Equipment (UE) as a device directly accessible to an end-user for establishing communication with a telecommunication network, and in turn, with similar communication devices connected to the communication network. The examples of the UE include, but are not limited to a hand-held telephone, a laptop computer equipped with a broadband adapter, an (IoT based) digital water flow meter, and (IoT based) digital electricity meter. The UE is configured to utilize a cellular connection such as a Long Term Evolution (LTE) cellular connection or a wireless local area network (WLAN) for data transmission.

Typically, conventional UE communication systems are set up using Point-to-Point (P2P) EPS bearers for each Utility UE. Thus, such conventional UE communication systems consume surplus resources and require multitude of core elements. Further, conventional UE communication systems are programmed to maintain a corresponding S5 bearer in 'ON' state even when the UE is not transmitting any data. In addition, the conventional UE communication systems do not transmission data packets of lower sizes and instead wait until enough bytes of data have been accumulated, in the process maintaining the S5 bearer in an 'ON' state, and thereby utilizing electrical energy.

In view of the foregoing, there is felt a need for a communication system that is capable of supporting low power UEs. Further, there exists a need for a communication system that allows the constituent bearers to be switched 'OFF' whenever there is no requirement for data transmission. Furthermore, there exists need for a system that automatically optimizes a network resource requirement for collection of low data size messages from a plurality of low power user equipments.

OBJECTS

The primary object of the present disclosure is to create a Multipoint-to-Point (MP2P) EPS bearer in a packet switched transmission network (PSTN).

Another object of the present disclosure is to utilize low data size user equipments (UE) or utility UEs to establish connection with other devices.

Yet another object of the present disclosure is to use multipoint to point (MP2P) EPS bearer setup at a utility UE thereby enabling the said utility UE to communicate with other devices.

Yet another object of the present disclosure is to optimize the number of peer-to-peer or point to point (P2P) EPS bearers used in a communication system.

Yet another object of the present disclosure is to effectively optimize network resources including bearers for collection of low data size messages from a plurality of user equipments.

One more object of the present disclosure is to eliminate a need for packet inspection at both the S1 bearer as well as the serving gateway.

Still a further object of the present disclosure is to cluster all the user equipments into a single group, regardless of the purposes and quality of service (QoS) parameters associated with each of the user equipments.

SUMMARY

In accordance with an embodiment of the present disclosure, a Multipoint-to-Point (MP2P) EPS bearer system operable in a packet switched transmission network is disclosed. The EPS bearer system includes a first User Equipment (UE-1), a second User Equipment (UE-2), a radio bearer, a mobile management entity (MME), an S1 bearer, an S5 bearer, an ENB, a serving gateway, and a packet data network gateway. In accordance with the present disclosure, a plurality of user equipments (UE) are installed at predetermined destinations for acquisition of relevant data. The user equipments are communicably coupled to respective radio bearers. Each radio bearer is configured to receive the data acquired by the user equipments. The radio bearers are communicably coupled to at least one S bearer, which, in turn, is communicably coupled to an S5 bearer. The S1 bearer multiplexes the data received from each of the radio bearers and transmits the multiplexed data to the S5 bearer, which, in turn, transmits the multiplexed data to a database server via a public network gateway. In accordance with the present disclosure, the Multipoint-to-Point EPS bearer is created by a communicable coupling between said radio bearers, the S1 bearer and the S5 bearer.

In accordance with the present disclosure, each of the user equipments (UE) are communicably to the eNodeB (ENB) regardless of at least one of a purpose associated with each of said user equipments, and Quality of Service (QoS) parameters associated with each of the user equipments. In accordance with the present disclosure, the communicable coupling of the eNodeB and the S1 bearer eliminates a need for packet inspection at the eNodeB—the process of packet inspection necessary for identifying the destination node for the corresponding data packets—for the said S1 bearer is programmed to be the destination for every uplink data packets transmitted from each of the user equipments. Further, since, in accordance with the present disclosure, the S bearer is designated as the destination for every downlink packet transmitted from the serving gateway and directed to any of the user equipments, the need for packet inspection is circumvented at the serving gateway. Further, in accordance with the present disclosure,

BRIEF DESCRIPTION OF THE DRAWINGS

The other objects, features and advantages will occur to those skilled in the art from the following description of the preferred embodiment and the accompanying drawings in which.

Although the specific features of the present disclosure are shown in some drawings and not in others, this is done for convenience only, as each feature may be combined with any or all of the other features in accordance with the present disclosure.

DETAILED DESCRIPTION

In the following detailed description, a reference is made to the accompanying drawings that form a part hereof, and in which the specific embodiments that may be practiced are shown by way of illustration. These embodiments are described in sufficient detail to enable those skilled in the art to practice the embodiments and it is to be understood that other changes may be made within the scope prescribed by the embodiments. The following detailed description is therefore not to be taken in a limiting sense, but in an explanatory sense.

Figure 1:
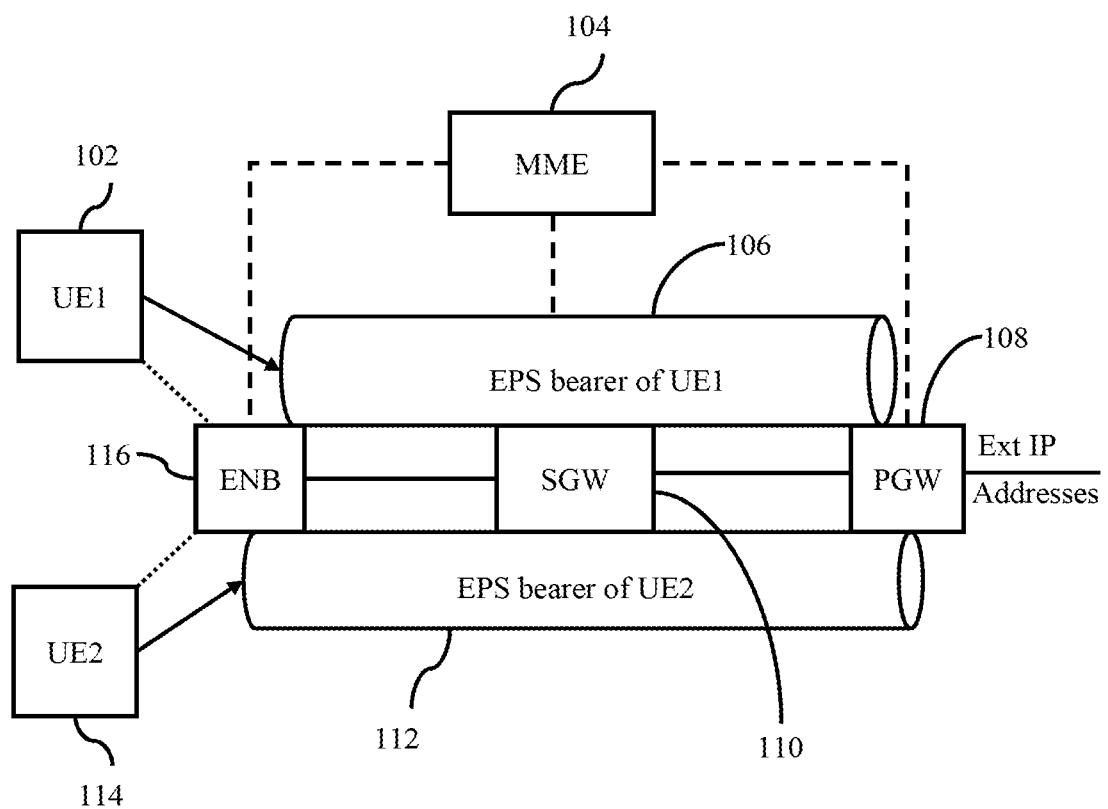
FIG. 1 is a block diagram illustrating a prior art UE setup.

FIG. 1 illustrates a block diagram of a prior art communication network. The communication network includes a first User Equipment (UE1) 102, a second User Equipment (UE2) 114, a mobile management entity (MME) 104, an EPS bearer 106 dedicated and communicably coupled to UE1, an EPS bearer 112 dedicated and communicably coupled to UE2, a packet data network gateway (PGW) 108, a serving gateway (SGW) 110, and an eNodeB (Evolved Node B; eNodeB) 116. The eNodeB 116 enables direct wireless communication between the UE and UE2.

As shown in FIG. 1, both user equipments, i.e. UE1 and UE2, are setup with respective (individual and dedicated) end-to-end EPS bearers (106 and 112 respectively) for uplink and downlink transmission of data. The UE1 102 is communicably coupled to the EPS bearer 106, while the UE-2 114 is communicably coupled to the EPS bearer 112. As is evident from FIG. 1, in order to transmit data to an external device, each of the user equipments (UE1 and UE2) use individual bearer systems, i.e. EPS bearer 106 and EPS bearer 112 respectively. As is evident from the prior art communication network illustrated in FIG. 1, the end-to-end EPS bearers (106 and 112) are always initiated by respective UEs (UE1 and UE2) for transmission of uplink data packets, while the EPS Bearers always remain in an 'ON' state to receive data from the corresponding UEs.

The various embodiments of the present disclosure envisage a bearer driven communication system incorporating enhancements necessary for to supporting a new class of user equipments (UE) including machine-to-machine and Internet-of-things (IoT) devices.

Figure 2:
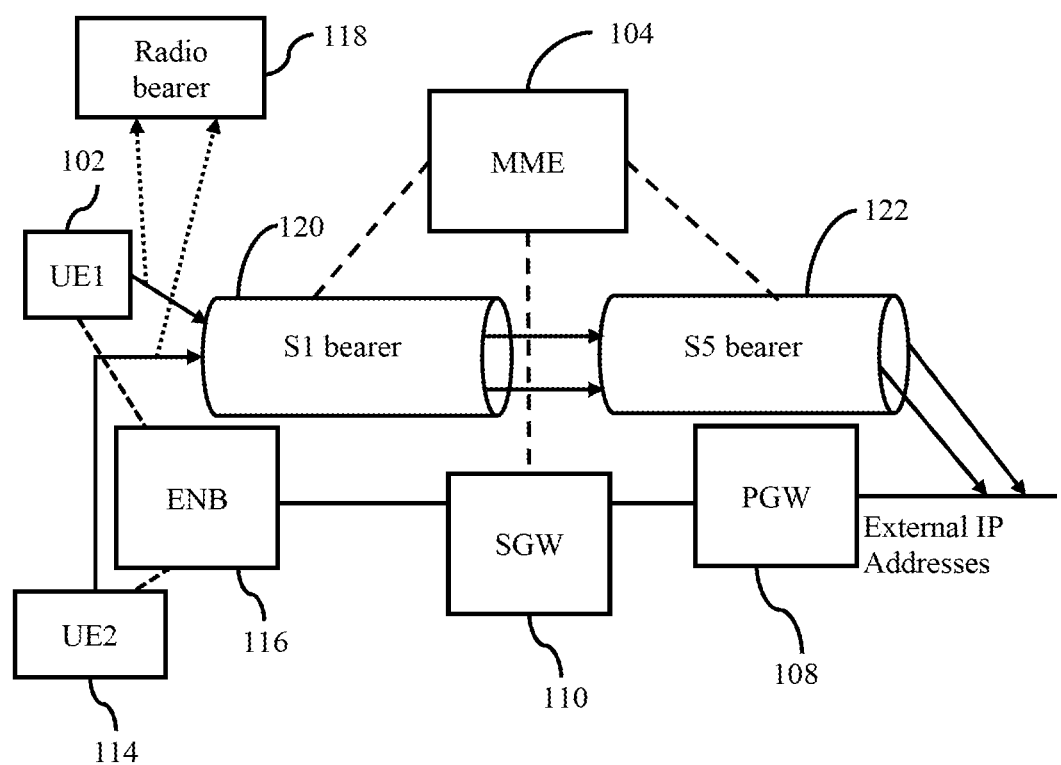
FIG. 2 illustrates a block diagram of a Multipoint-to-Point (MP2P) EPS bearer system, according to one embodiment of the present disclosure.

FIG. 2 illustrates a block diagram of a Multipoint-to-Point (MP2P) EPS bearer system, according to one embodiment of the present disclosure. The Multipoint-to-Point (MP2P) EPS bearer system 100, in accordance with the present disclosure, includes a first User Equipment (UE1) 102, a second User Equipment (UE2) 114, a radio bearer 118 (typically, radio bearers function as bi-directional channels for transfer of either user or control data), a mobile management entity (MME) 104, an S1 bearer 120 in communication with UE1 102 and UE2 114, an S5 bearer 122, an ENB (eNodeB) 116, a serving gateway (SGW) 110, and a packet data network gateway (PGW) 108. In accordance with the present disclosure, each of the user equipments, i.e., UE1 102 and UE2 114, are communicably coupled to the sole eNodeB 116 regardless of the purpose associated with each of the user equipments (102 and 114), and the quality of service (QoS) parameters associated with the user equipments (102 and 114), whereas in prior-art systems and methods the user equipments are always grouped together basis the corresponding purposes and QoS parameters interalia, and specific groups of user equipments are communicably coupled to distinct eNodeBs.

In accordance with the present disclosure, the examples of the first utility equipment 102 and the second utility equipment 114 include, but are not limited to a mobile station, an IoT based digital electricity meter, and an IoT enables digital water meter. Typically, in the case of the Multipoint-to-Point EPS bearer system 100 envisaged by the present disclosure, the S1 bearer 120 is communicably coupled to every eNodeB 116 (Evolved Node B or ENB) located within a tracking area (TA) pre-assigned to the serving gateway 110. And in this case, the user equipments 102 and 114 are communicably coupled to the eNodeB 116. In accordance with the present disclosure, the user equipments 102 and 114 are communicably coupled to the eNodeB 116, with the eNodeB 116 communicably coupled to the S1 bearer 102, and the S1 bearer communicably coupled to the S5 bearer 122, with the communicable coupling between the eNodeB 116, S1 bearer 120, and S5 bearer 122 forming the MP2P EPS bearer 100. In accordance with the present disclosure, since the user equipments 102 and 114 (and any more user equipments assigned to the serving gateway 110) are connected to the sole eNodeB 116, the S1 bearer 120 which is communicably coupled to the eNodeB 116 is designated to be the designation for each data packet emanating from the user equipments 102 and 114 (and also, any more user equipments located within the tracking area assigned to the serving gateway 110). And since the S1 bearer 120 is designated as the sole designation for every data packet originating from the user equipments 102 and 114, and transmitted via the eNodeB 116, the phenomenon of packet inspection—which involves deep inspection of a packet for determining at least the source and the destination of the packet, and thus involves utilization of dedicated packet filtering resources—is obviated at the eNodeB 116. The phenomenon of packet inspection at the eNodeB 116 is eliminated, for every data packet received at the eNodeB 116 is pre-programmed, given the communicable coupling between the eNodeB 116, S1 bearer 120, and S5 bearer 122, to indicate the S1 bearer 120 as the sole destination. Likewise, when any downlink packets are to be transmitted from the serving gateway 110 to the user equipments 102 and 114, it is understandable that all such downlink packets would be routed to the respective user equipments 102 and 114 via the S5 bearer 112, S1 bearer 120, and eNodeB 116. And therefore, while the responsibility of routing the downlink data packets to appropriate user equipments finally rests with the eNodeB 116, the S1 bearer 120, which is communicably coupled to the eNodeB, is regarded as the destination for every downlink packet originating from the serving gateway 110, for every downlink packet is to be eventually transmitted to the eNodeB 116 for further downlink transmission to relevant user equipments, thereby eliminating the need for packet inspection at the serving gateway 110.

In accordance with the present disclosure, the S1 bearer 120 is also communicably coupled to an S5 bearer 122, as shown in FIG. 2. The MME 104 initiates set up of multipoint-to-point (MP2P) EPS bearer in a plurality of ways, including initiating the setup of MP2P EPS bearer is via the MME 104 or via a special user equipment (not shown in figures) that requests the MME104 for such a setup. In accordance with the present disclosure, the MP2P EPS bearer 100 renders the bearer setup independent of the paging message, and decouples the phases of setting up the MP2P bearer and transmitting a paging message, contrary to the prior art schemes in which setup of an EPS bearer is always followed the transmission of the paging message to the relevant user equipments. In accordance with the present disclosure, upon completion of the setup of the MP2P EPS bearer 100, a paging message is transmitted to all the user equipments (116) within the predetermined tracking area pre-assigned to the serving gateway 110. And in this case, the paging message is transmitted to the UE1 102 and UE2 114 in order to trigger the said user equipments to initiate transmission of the (acquired) data. Following the receipt of the paging messages, the user equipments 102 and 114 initiate transmission of the (acquired) data via the radio bearer 118. In accordance with the present disclosure, the user equipments 102 and 114 transmit the acquired data to the eNodeB 116, which, in turn, multiplexes the data received from the user equipments 102 and 114, and transmits the multiplexed data to the S1 bearer 120. The S1 bearer 120, in turn, transmits the multiplexed data to the S5 bearer 122. Subsequently, the multiplexed data is transmitted from the S5 bearer 122 to a pre-determined database server (not shown in figures) via the serving gateway 110.

In accordance with the present disclosure, the paging message and the setup of the MP2P EPS Bearer 100 are decoupled. The MP2P EPS bearer 100 is setup only when meter readings, i.e., data, are to be acquired from the user equipments 102 and 114. Further, once the data is acquired from the user equipments 102 and 114, the associated MP2P EPS bearer 100 is turned dormant (inactive). Further, the MP2P bearer 100 also accommodates user equipments, which are refereed as utility user equipments, given their capability to acquire and transmit comparatively lower volumes of data. The MP2P EPS bearer 100 also optimizes the existing P2P EPS bearer system by collecting lower sized data from a plurality of utility user equipments (102 and 114 in this case), and further ensures that the quantum of network resource elements utilized for acquiring such lower volumes of data is also optimized. In an exemplary embodiment of the present disclosure, the size of the data acquired and transmitted by a user Equipment (102 or 114 in this case) is 'forty' bits per month.

Figure 3A:
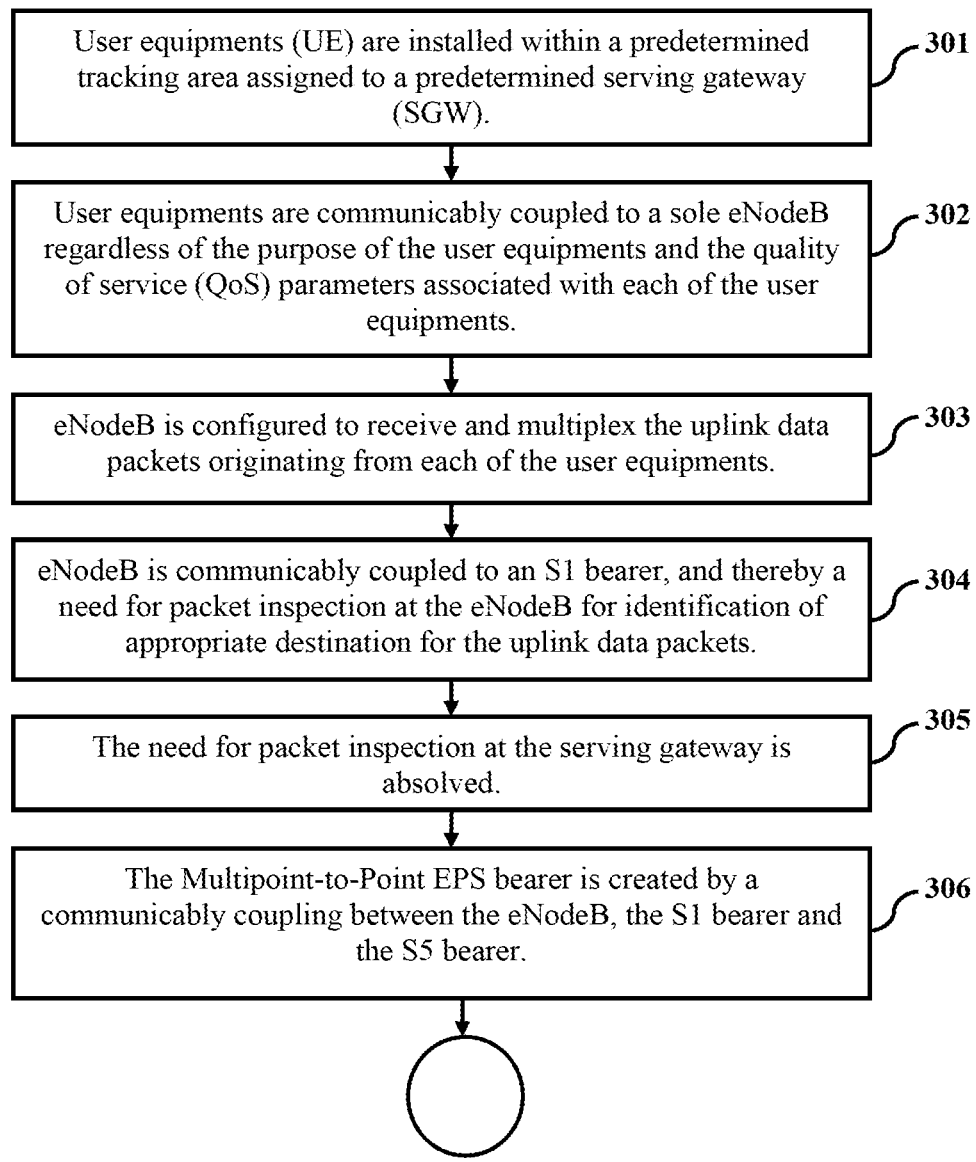
FIG. 3A and FIG. 3B, in combination, illustrate a flowchart describing a method for creating a Multipoint-to-Point (MP2P) EPS bearer in a packet switched transmission network, according to one embodiment of the present disclosure.
Figure 3B:
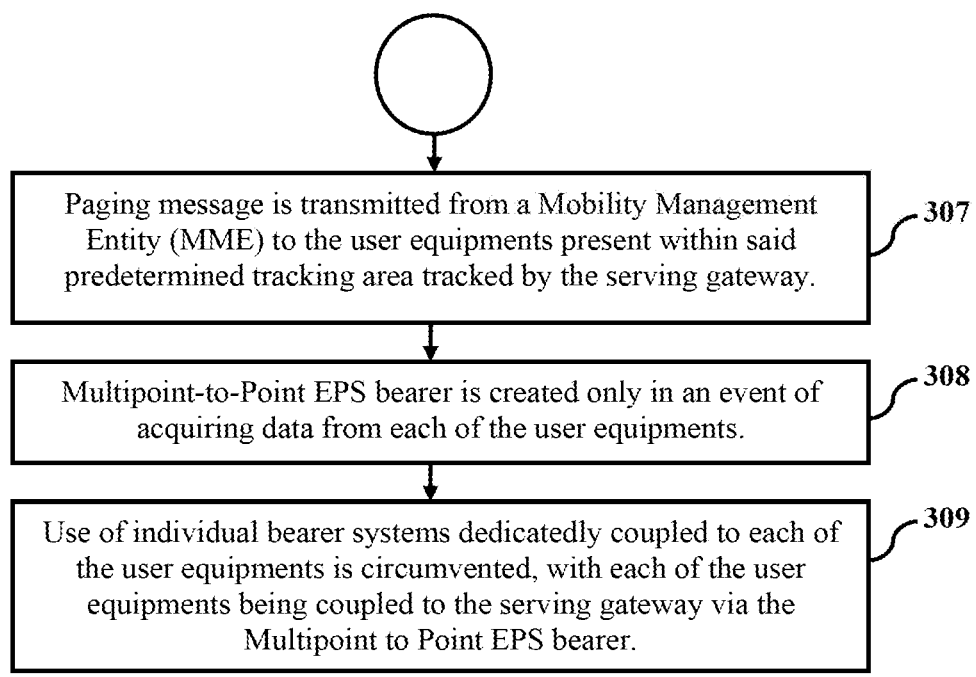

In accordance with the present disclosure, FIG. 3A and FIG. 3B in combination illustrate the steps involved in a method for creating a Multipoint-to-Point (MP2P) EPS bearer. The implementation of the method begins at step 301, wherein a plurality of user equipments (UE) are installed within a predetermined tracking area assigned to a predetermined serving gateway (SGW). At step 302, each of the user equipments are communicably coupled to a sole eNodeB regardless of the purpose of the user equipments and the quality of service (QoS) parameters associated with each of the user equipments. Essentially, the sole eNodeB to which all the user equipments are coupled is also located within the tracking area assigned to the said serving gateway. Further, at step 303, the eNodeB is configured to receive and multiplex the uplink data packets originating from each of the user equipments. Further, at step 304, the eNodeB is communicably coupled to an S1 bearer, and thereby a need for packet inspection at the eNodeB for identification of appropriate destination for the uplink data packets, for the S1 bearer is the only possible uplink destination available for the data packets transmitted from the eNodeB. Likewise, at step 305, the need for packet inspection at the serving gateway is absolved, for the eNodeB is communicably coupled to the S1 bearer, and the S1 bearer is communicably coupled to the S5 bearer, and the S5 bearer is communicably coupled to the serving gateway, with the S1 bearer serving as the only intermediate destination for the downlink packets originating from the serving gateway and directed to the eNodeB, given the communicable coupling between the serving gateway, the S5 bearer, S1 bearer, and the eNodeB (in that order). Further, at step 306, the Multipoint-to-Point EPS bearer is created by a communicably coupling between the eNodeB, the S1 bearer and the S5 bearer, with the Multipoint-to-Point EPS bearer facilitating transmission of both uplink data packets and downlink data packets without packet inspection. Further, at step 307, a paging message is transmitted from a Mobility Management Entity (MME) to the user equipments present within the predetermined tracking area tracked by the serving gateway, but only after creation of the Multipoint-to-Point EPS bearer. Further, at step 308, the Multipoint-to-Point EPS bearer is created only in an event of acquiring data from each of the user equipments, with the MP2P EPS bearer being deactivated immediately after the data is received from each of the user equipments, thereby ensuring energy conservation and network resource conservation inter-alia at the MP2P EPS bearer. Lastly, at step 309, the use of individual bearer systems dedicatedly coupled to each of the user equipments is circumvented, with each of the user equipments being coupled to the serving gateway via the Multipoint to Point EPS bearer.

TECHNICAL ADVANTAGES

The present disclosure provides a system for creating a point to multipoint (MP2P) EPS bearer. The MP2P EPS bearer envisaged by the present disclosure circumvents the use of individual bearer systems for individual user equipments. Further, the MP2P EPS bearer is also configured to accommodate utility user equipments, which, in turn, are programmed to acquire and transmit comparatively lower volumes of data. In accordance with the present disclosure, the MP2P EPS bearer is powered 'ON' only when exists a need for data transmission. The MP2P EPS bearer system provides high-speed data transfer in both uplink and downlink, while decoupling the paging message from the process of setting up the EPS bearer. Further, the MP2P EPS bearer eliminates a need for packet inspection at both the S1 bearer as well as the serving gateway, basis the communicable coupling between the user equipments, the eNodeB, S1 bearer, S5 bearer, and serving gateway (in that order).

Further, the MP2P EPS bearer envisaged by the present disclosure provides for all the user equipments to be clustered into a single group, regardless of the purposes and quality of service (QoS) parameters associated with each of the user equipments.

What is claimed is:

1. A method for creating a Multipoint-to-Point (MP2P) EPS bearer in a packet switched transmission network, said method comprising the following steps:

installing a plurality of user equipments (UE) at predetermined destinations located within a predetermined tracking area, to acquire data in form of uplink data packets therefrom, each of said user equipments communicably coupled to an eNodeB, said eNodeB located within said predetermined tracking area tracked by a Serving Gateway (SGW), and wherein each of said user equipments are communicably coupled to said eNodeB regardless of at least one of a purpose associated with each of said user equipments, and Quality of Service (QoS) parameters associated with each of said user equipments;

configuring said eNodeB to receive the uplink data packets transmitted from each of said user equipments;

communicably coupling said eNodeB to an S1 bearer, and eliminating a need for packet inspection at said eNodeB for identification of appropriate destination for said uplink data packets, by designating said S1 bearer as destination for said uplink data packets transmitted from said eNodeB, and further eliminating said need for packet inspection at said Serving Gateway for identification of said appropriate destination for any downlink data packets to be transmitted to said eNodeB, by designating said S1 bearer as said destination for said downlink data packets transmitted via said Serving Gateway;

configuring said S1 bearer to multiplex said uplink data packets received from said eNodeB;

communicably coupling said S1 bearer to an S5 bearer, and configuring said S5 bearer to receive multiplexed uplink data packets from the S1 bearer, and to transmit received multiplexed uplink data packets to a database server via a predetermined Packet Network Gateway (PGW), wherein, said Multipoint-to-Point EPS bearer is created by a communicably coupling between said eNodeB, said S1 bearer and said S5 bearer, and further enabling said Multipoint-to-Point EPS bearer to be communicably coupled to each of said plurality of user equipments for transmission of both said uplink data packets and said downlink data packets without said packet inspection;

transmitting a paging message from a Mobility Management Entity (MME) to at least some of said plurality of user equipments present within said predetermined tracking area tracked by said Serving Gateway, only after creation of said Multipoint-to-Point EPS bearer;

creating said multipoint-to-Point EPS bearer only in an event of acquiring data from each of said user equipments, and deactivating said Multipoint-to-Point EPS bearer immediately after receiving said data from each of said user equipments; and preventing use of individual bearer systems dedicatedly coupled to each of said user equipments, by communicably coupling each of said plurality of user equipments directly to said Multipoint to Point EPS bearer.

2. The method as claimed in claim 1, wherein the method further includes the step of configuring said Multipoint-to-Point EPS bearer using an MME (Mobility Management Entity) protocol.

3. The method as claimed in claim 2, wherein the step of configuring the Multipoint-to-Point (MP2P) EPS bearer, further includes the step of configuring said Multipoint-to-Point EPS bearer using a customized User Equipment.

4. The method as claimed in claim 1, wherein the step of transmitting a paging message from a Mobility Management Entity (MME) to at least some of said plurality of user equipments present within said predetermined tracking area tracked by said Serving Gateway, only after creation of said Multipoint-to-Point EPS bearer, further includes the step of decoupling creation of said Multipoint-to-Point EPS bearer from transmission of said paging message.

5. The method as claimed in claim 4, wherein the step of decoupling creation of said Multipoint-to-Point EPS bearer from transmission of said paging message, further includes the step of rendering the creation of said Multipoint-to-Point EPS bearer independent of the transmission of said paging message from said Mobility Management Entity to said plurality of user equipments present within said predetermined tracking area.

6. The method as claimed in claim 1, wherein the step of configuring said eNodeB to receive the uplink data packets transmitted from each of said user equipments, further includes the step of configuring said eNodeB to receive and transmit to each of said user equipments, downlink data packets directed to each of said user equipments.

7. The method as claimed in claim 1, wherein the step of configuring said S1 bearer to multiplex said uplink data packets received from said eNodeB, further includes the step of configuring said S1 bearer to multiplex said downlink packets directed to said eNodeB and subsequently each of the user equipments connected to said eNodeB.

8. The method as claimed in claim 1, wherein the step of deactivating said Multipoint-to-Point EPS bearer immediately after receiving said data from each of said user equipments, further includes the step of maintaining said Multipoint-to-Point EPS bearer in a state of deactivation until a new set of data is to be acquired from each of said user equipments communicably coupled to said eNodeB.

* * * * *